No. 739,420. Patented September 22, 1903.

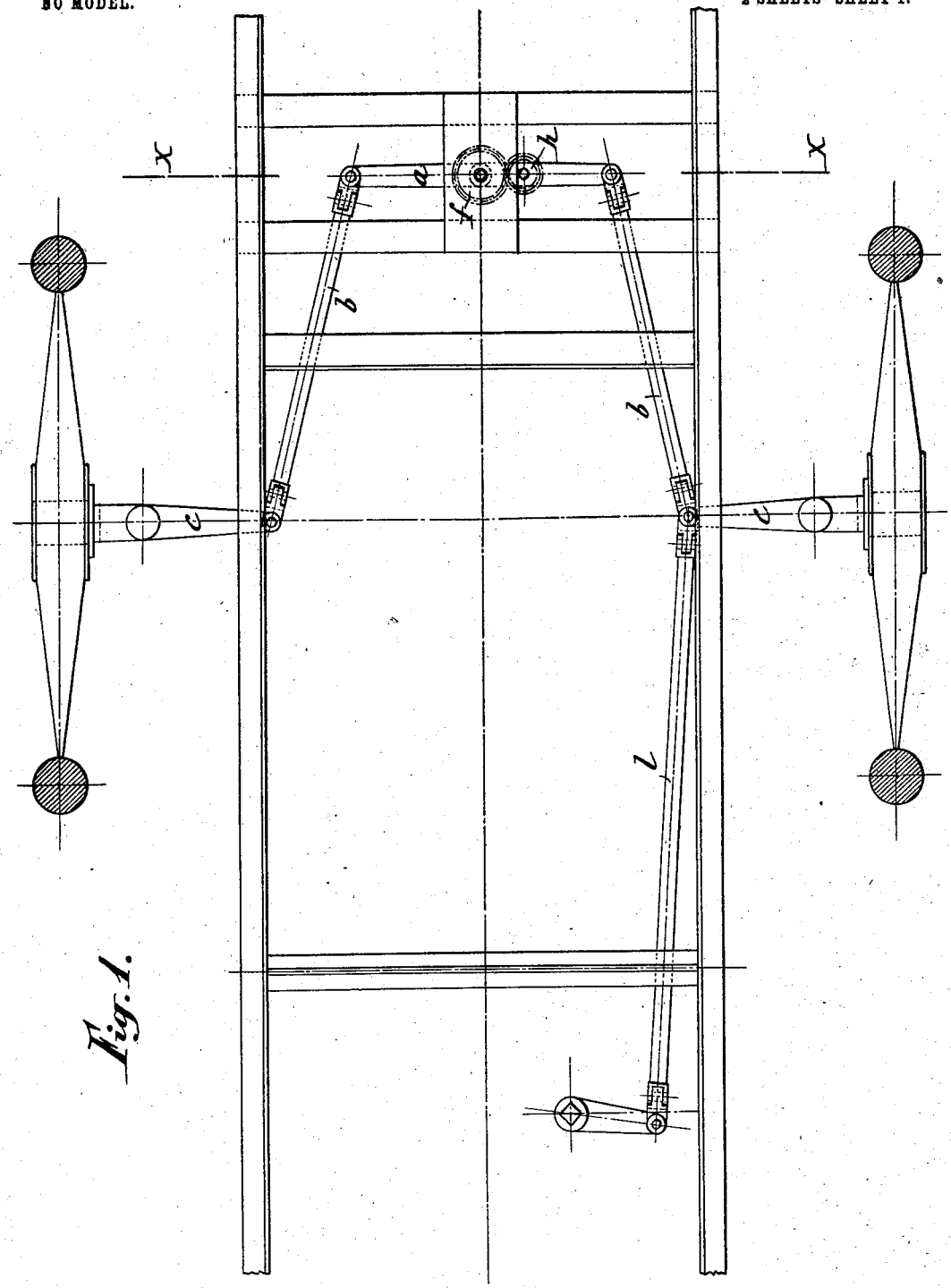

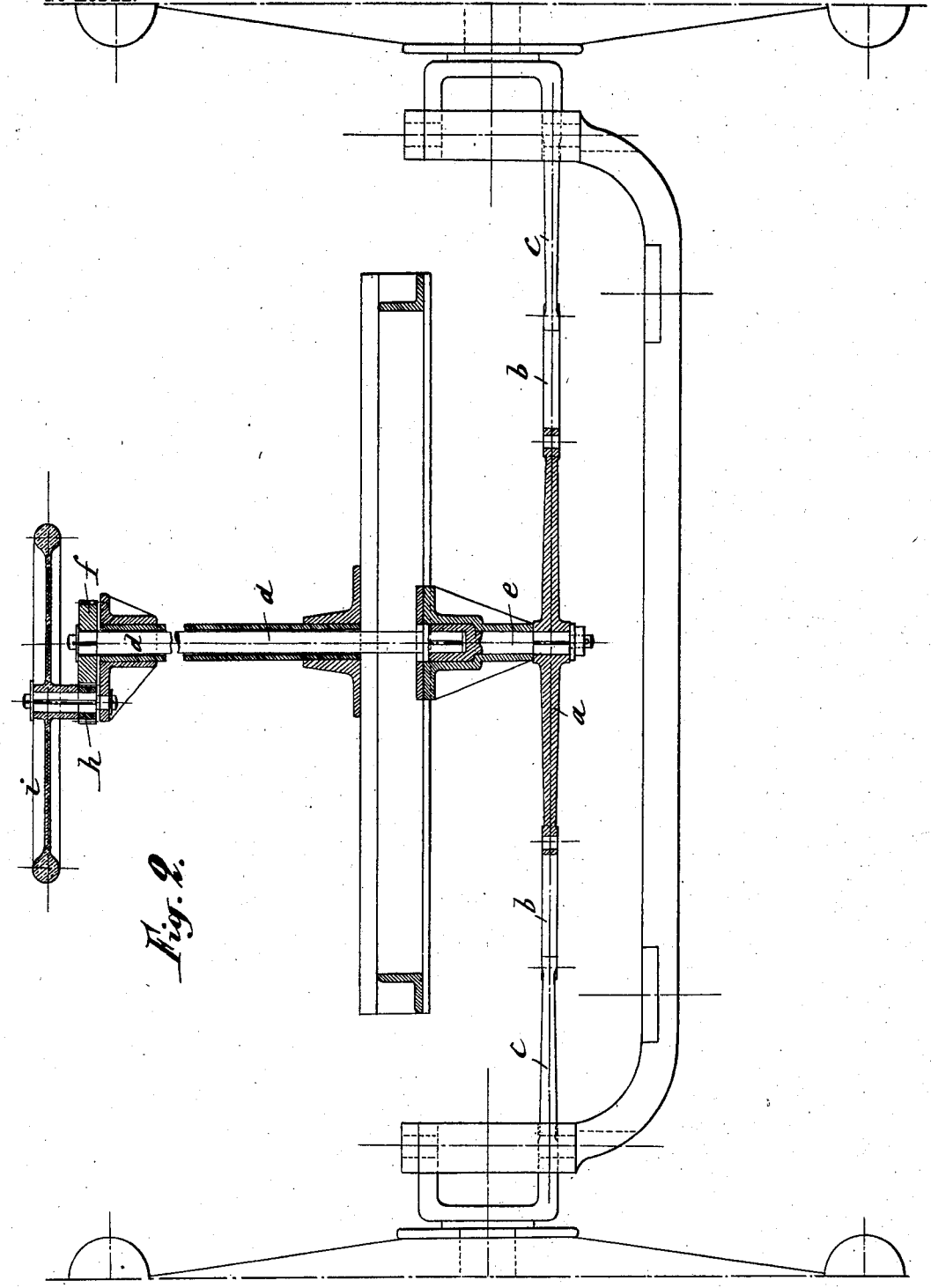

UNITED STATES PATENT OFFICE.

ANTOINE JANSSENS, OF ST. NICOLAS, BELGIUM.

APPARATUS FOR STEERING MOTOR-VEHICLES.

SPECIFICATION forming part of Letters Patent No. 739,420, dated September 22, 1903.

Application filed December 24, 1901. Serial No. 87,116. (No model.)

*To all whom it may concern:*

Be it known that I, ANTOINE JANSSENS, a citizen of the Kingdom of Belgium, and a resident of Rue du Gazométre, St. Nicolas, Belgium, have invented a certain new and useful Apparatus for Steering Motor-Cars, of which the following is a specification.

My invention relates to a suitable device for steering motor-cars; and it consists more particularly of a novel wheel connection, affording a sufficient place for the arrangement of motor parts between the wheels and allowing the use of straight steering-levers perpendicular to the plane of said wheels. Substantially the novel wheel connection has the shape of a trapezium the smaller basis of which is situate in front of the steering-axle and consists of a two-armed cross-lever having its pivot in the axis of the vehicle, whereas the sides are composed of two rods connected at one end to the said two-armed cross-lever and at the other end to a steering-lever forming a prolongation of the axle-spindles and being perpendicular to the plane of the wheels. The arrangement of the cross-lever representing the smaller basis of the trapezium in front of the steering-axle is indispensable in order to perform the steering according to theory, which applied to divided axles requires that the common center of the curves described by the wheels be always situate in the prolongation of the rear axle.

The annexed drawings show, by way of example, an embodiment of my wheel connection.

Figure 1, Sheet 1, is a plan view of the device; and Fig. 2, Sheet 2, is a front elevation of the same.

A is the two-armed cross-lever, mounted under the frame of the carriage and having its pivot E in the axis of the vehicle in front of the steering-axle.

B B are the two rods connecting the cross-lever A with the steering-levers C C, which latter form part of the axle spindles or journals, as in all ordinary cases, but are arranged so as to be perpendicular to the plane of the wheels.

The controlling of the direction of the vehicle may be effected directly by any known mechanism or steering-shaft mounted upon the pivot E or indirectly at the rear part of the carriage by means of a rod attached to any convenient point of the wheel connection.

The working of my device is as follows: By shifting the cross-lever A, with the intention to turn the vehicle, the rods B B impart an angular motion to the steering-levers C C, which angular motion is greater for the wheel situate inside the curve than for that outside of it and must be so in order to obtain a common center for the curves described by the wheels of the vehicle. This result is effectually obtained by the present wheel connection, thanks to the situation of the cross-lever and the obliquity of the connecting-rods B B, which obliquity, together with the proportions of the trapezium, may be varied according to the gage of the wheels and the distance of their axles.

Having explained the nature of my invention, what I desire to claim and secure by Letters Patent is—

In a steering apparatus for motor-cars having divided steering-axles: a wheel connection consisting of a trapezium the smaller basis of which is situated in front of the steering-axle and forms a two-armed cross-lever A having its pivot E in the axis of the vehicle, whereas the sides are composed of rods B B which are linked, at the smaller basis, to said cross-lever A and at the greater open basis, to the axle-spindle arms C C arranged perpendicular to the plane of the wheels, substantially as specified and shown.

In witness whereof I have hereunto set my hand in presence of two witnesses.

ANTOINE JANSSENS.

Witnesses:
 ALBERT FRAIPENE,
 GREGORY PHELAN.